June 18, 1940.                    M. ROMAINE ET AL                    2,205,277
                                  BROACHING MACHINE
                                 Filed Oct. 27, 1937                 10 Sheets-Sheet 9
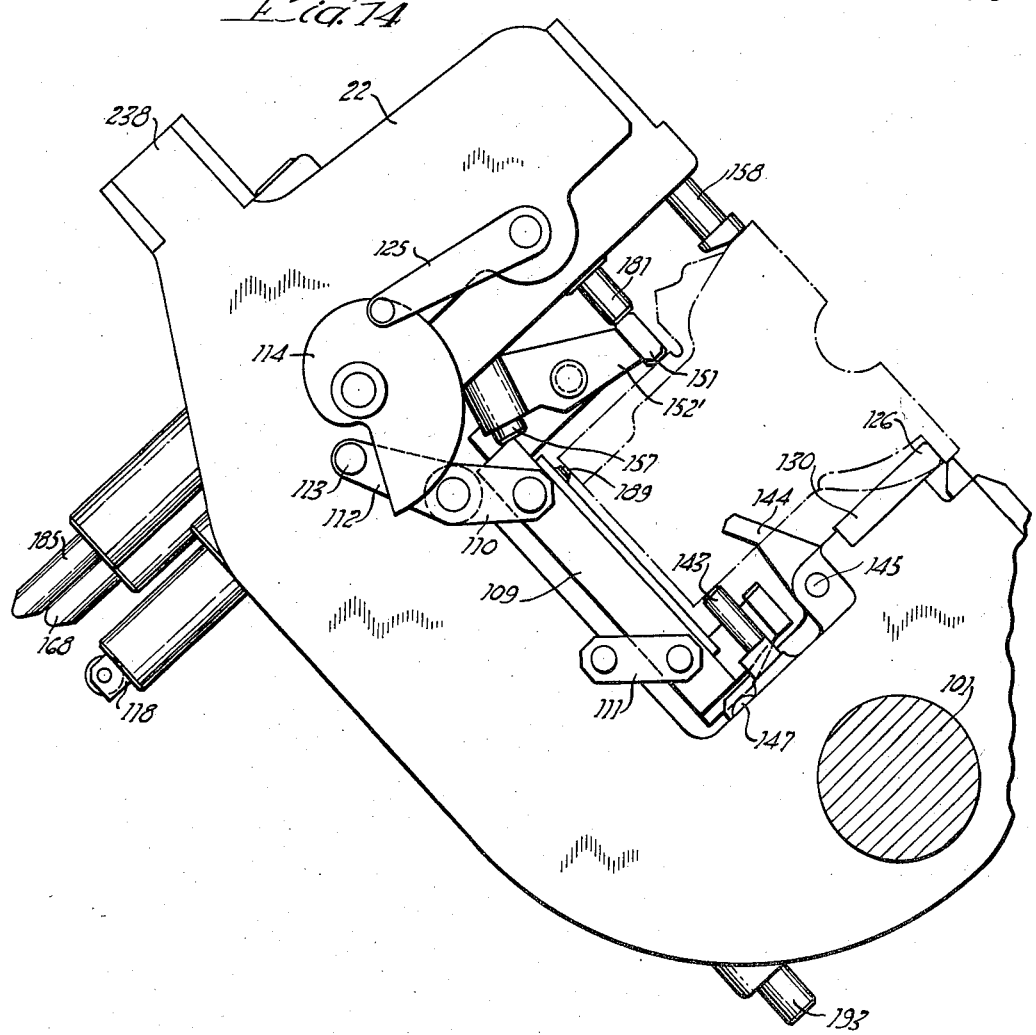
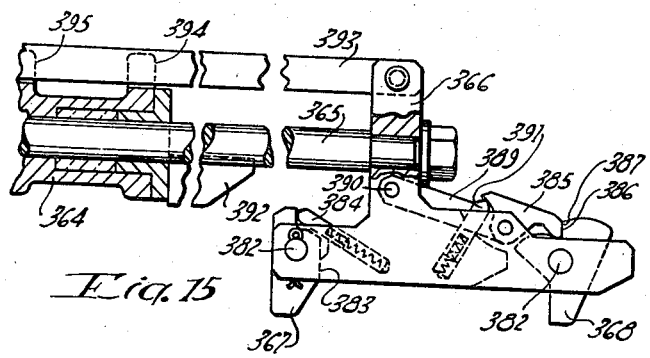
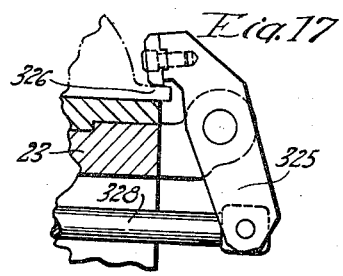
INVENTOR.
MILLARD ROMAINE
AMOS H. HAWLEY
HERMAN HORLACHER
BY
A.H. Parsons
ATTORNEY.

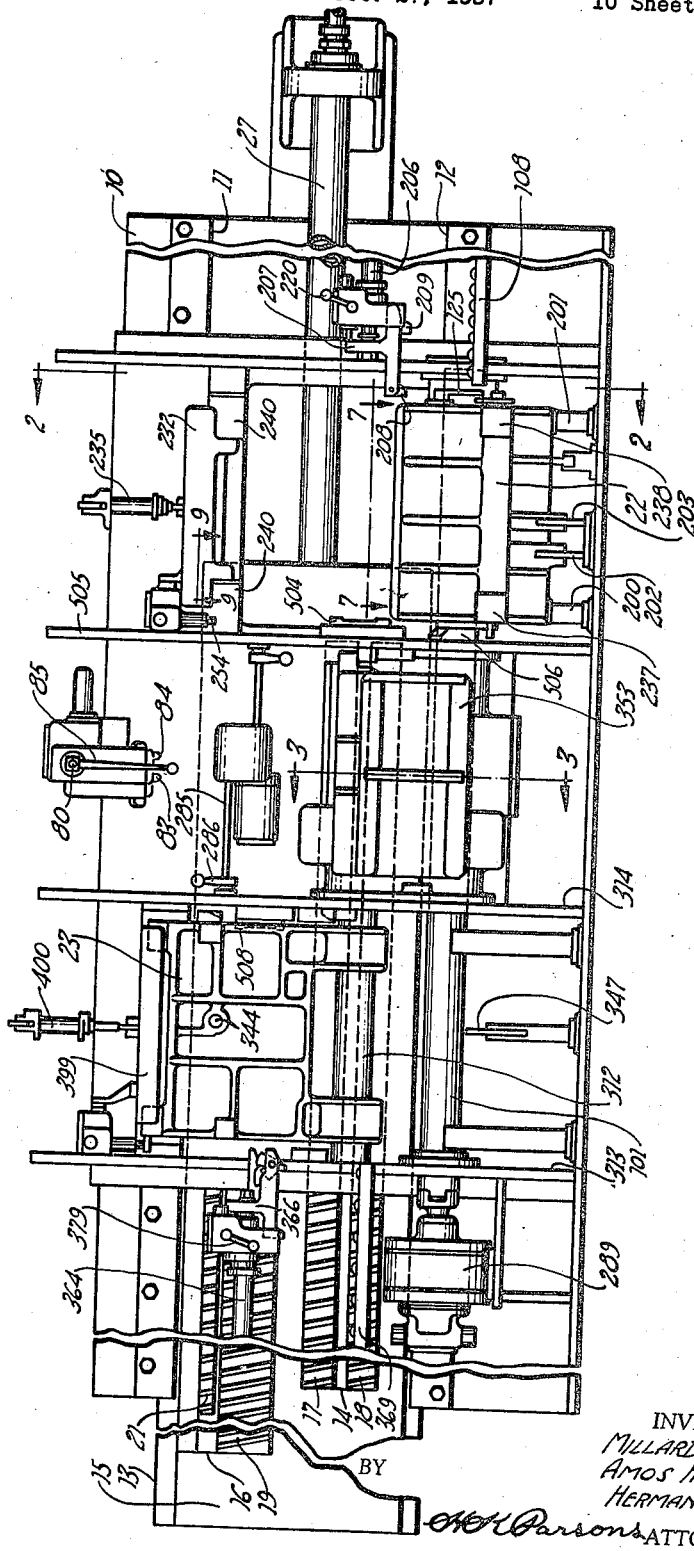

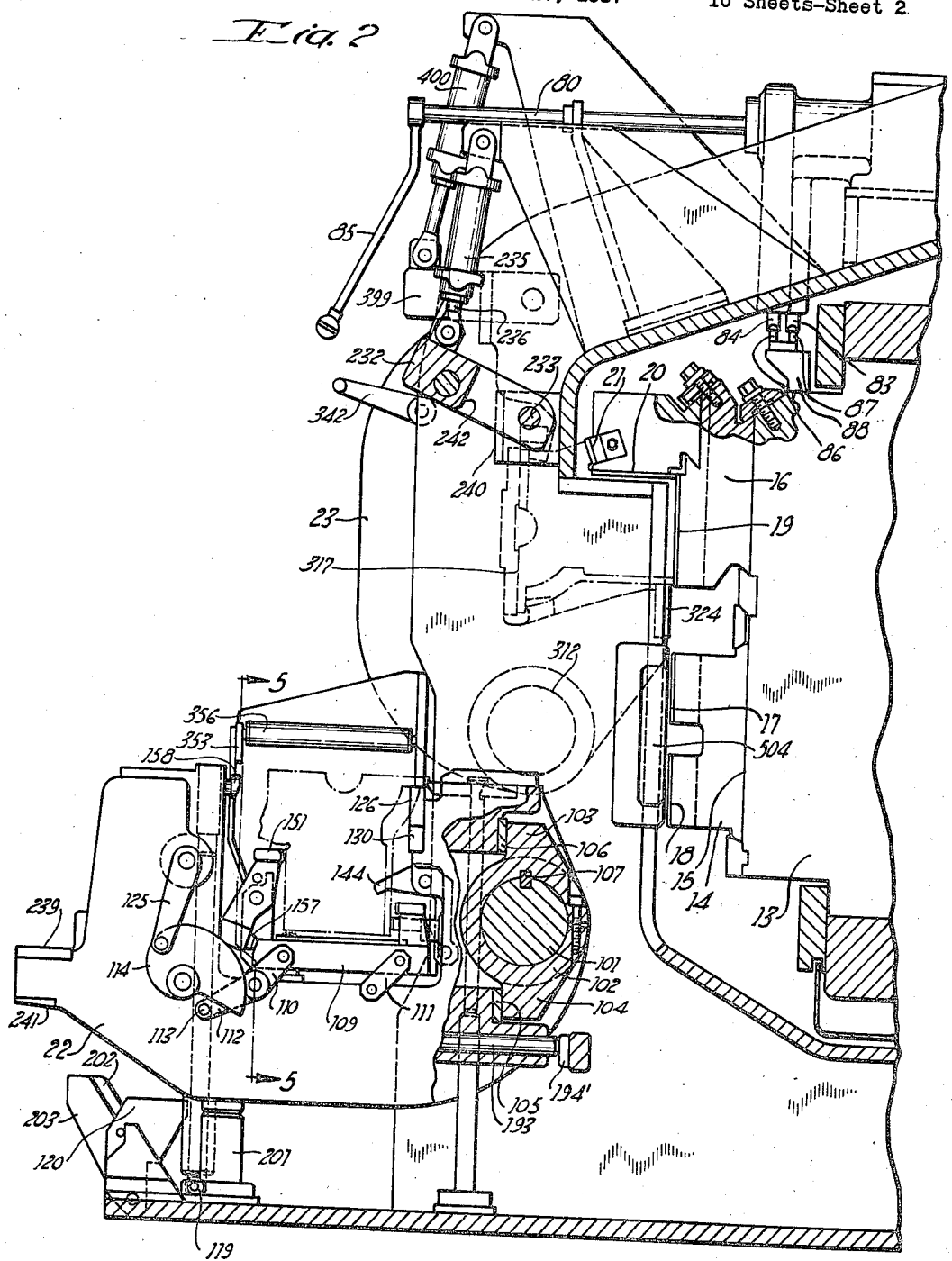

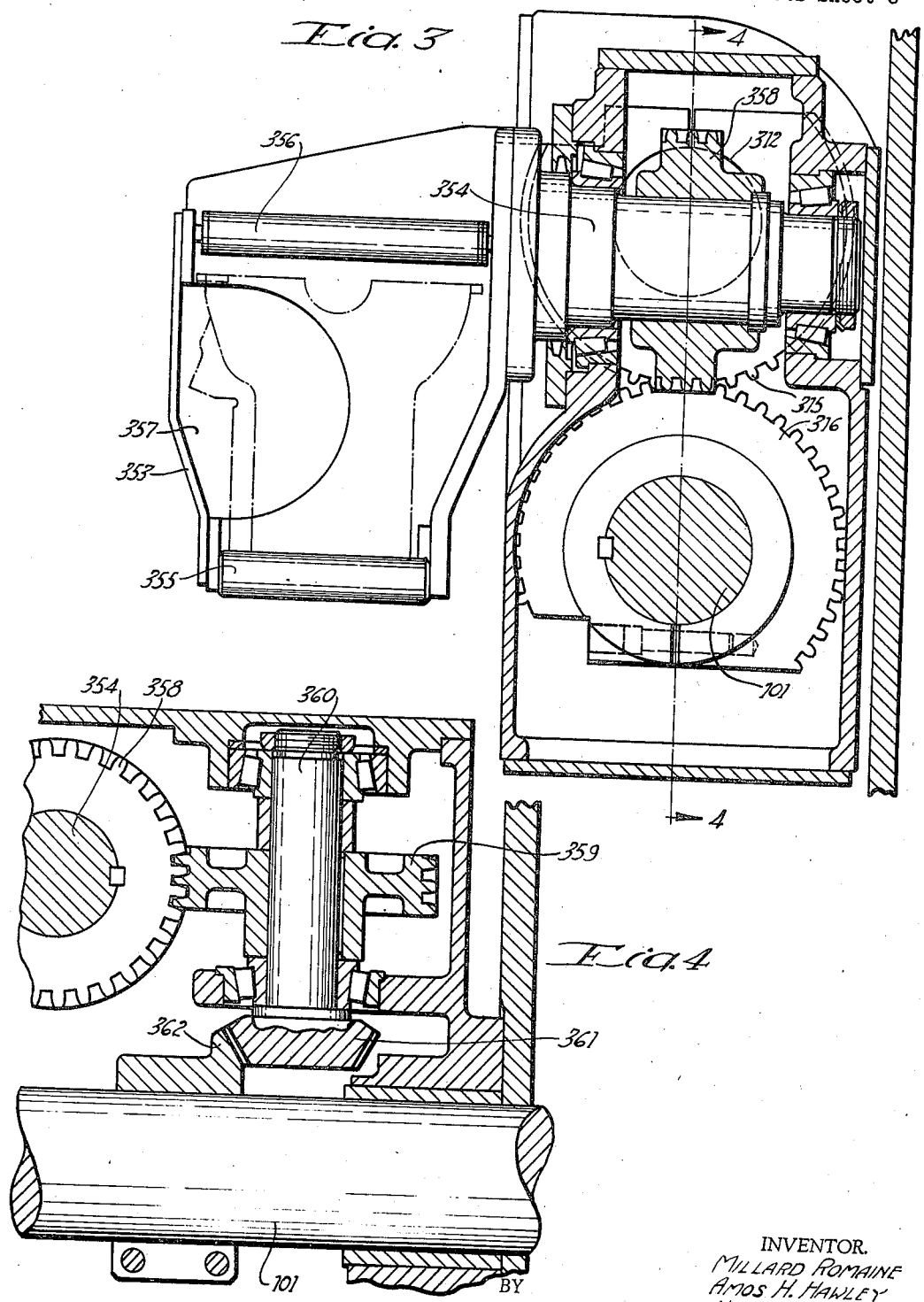

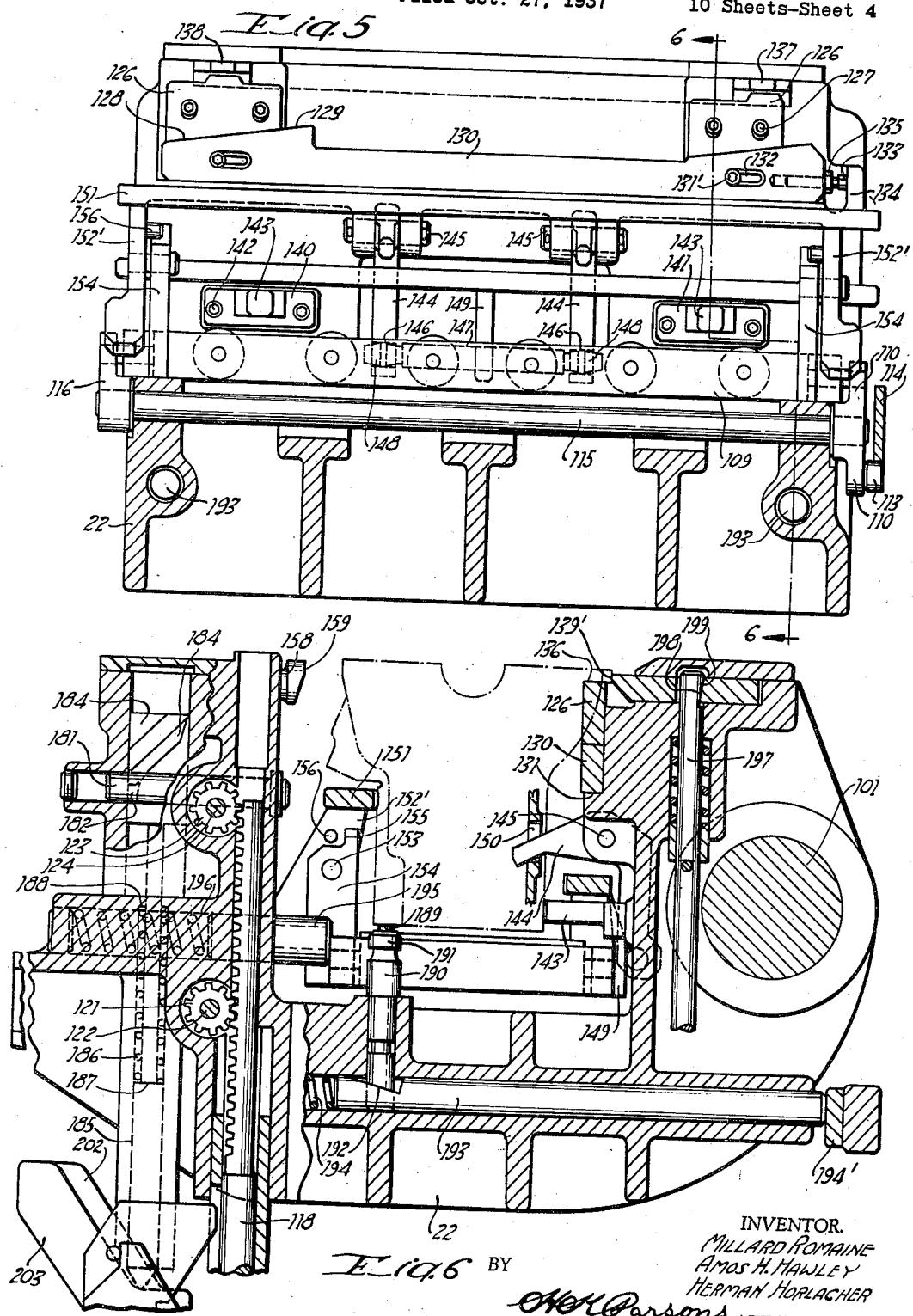

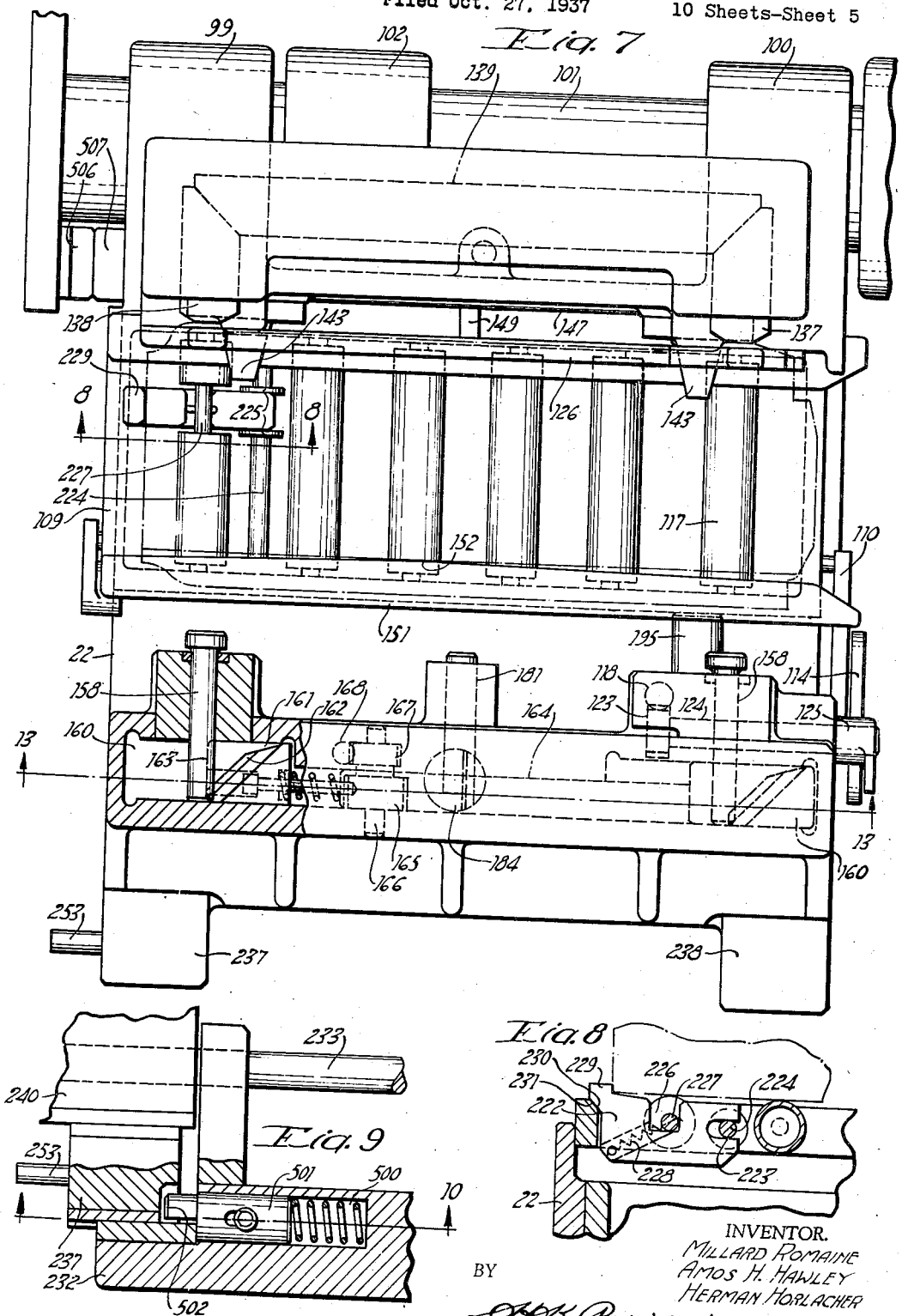

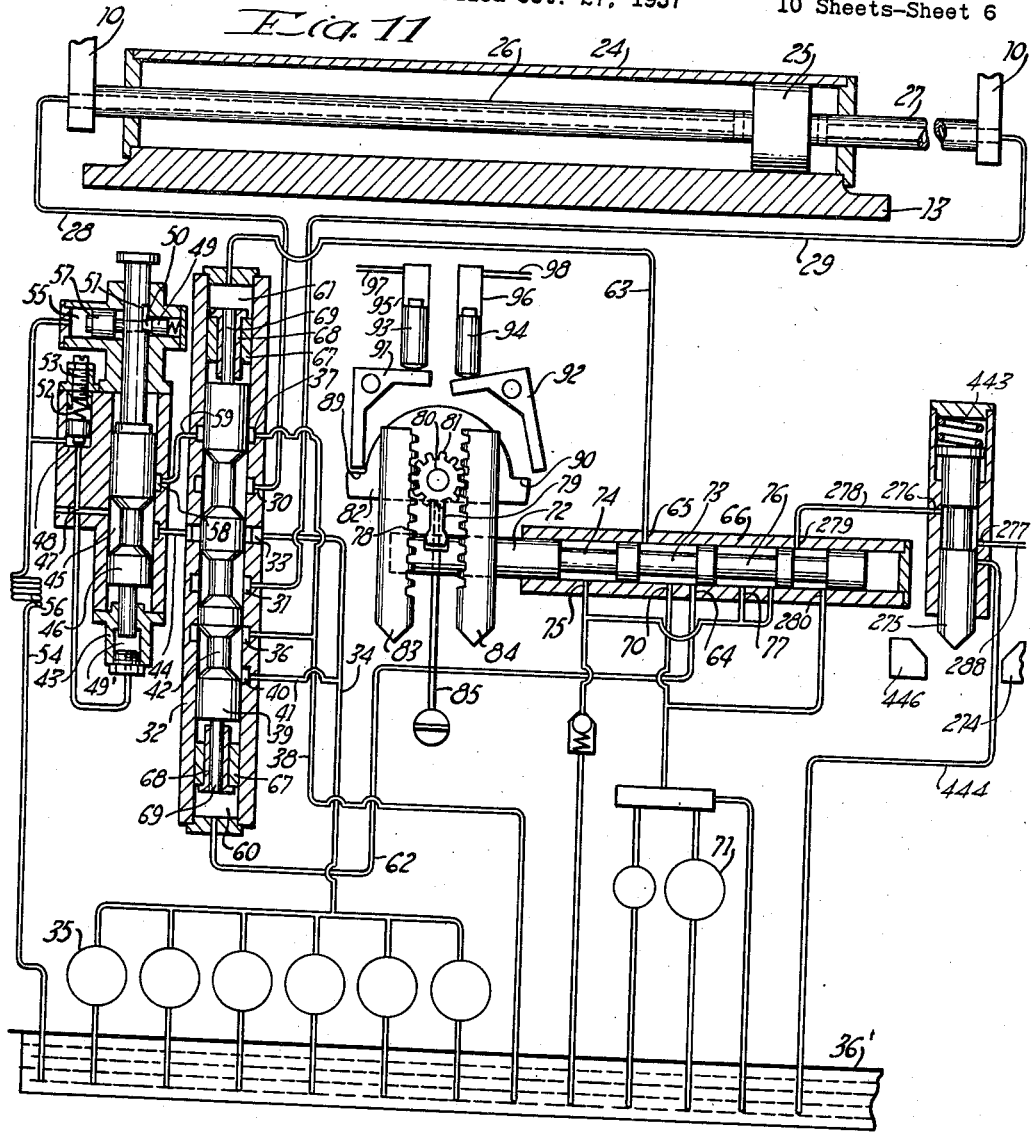
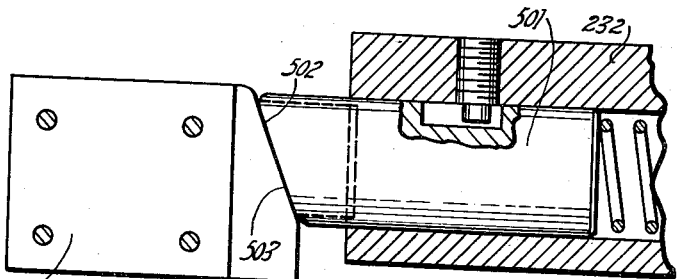

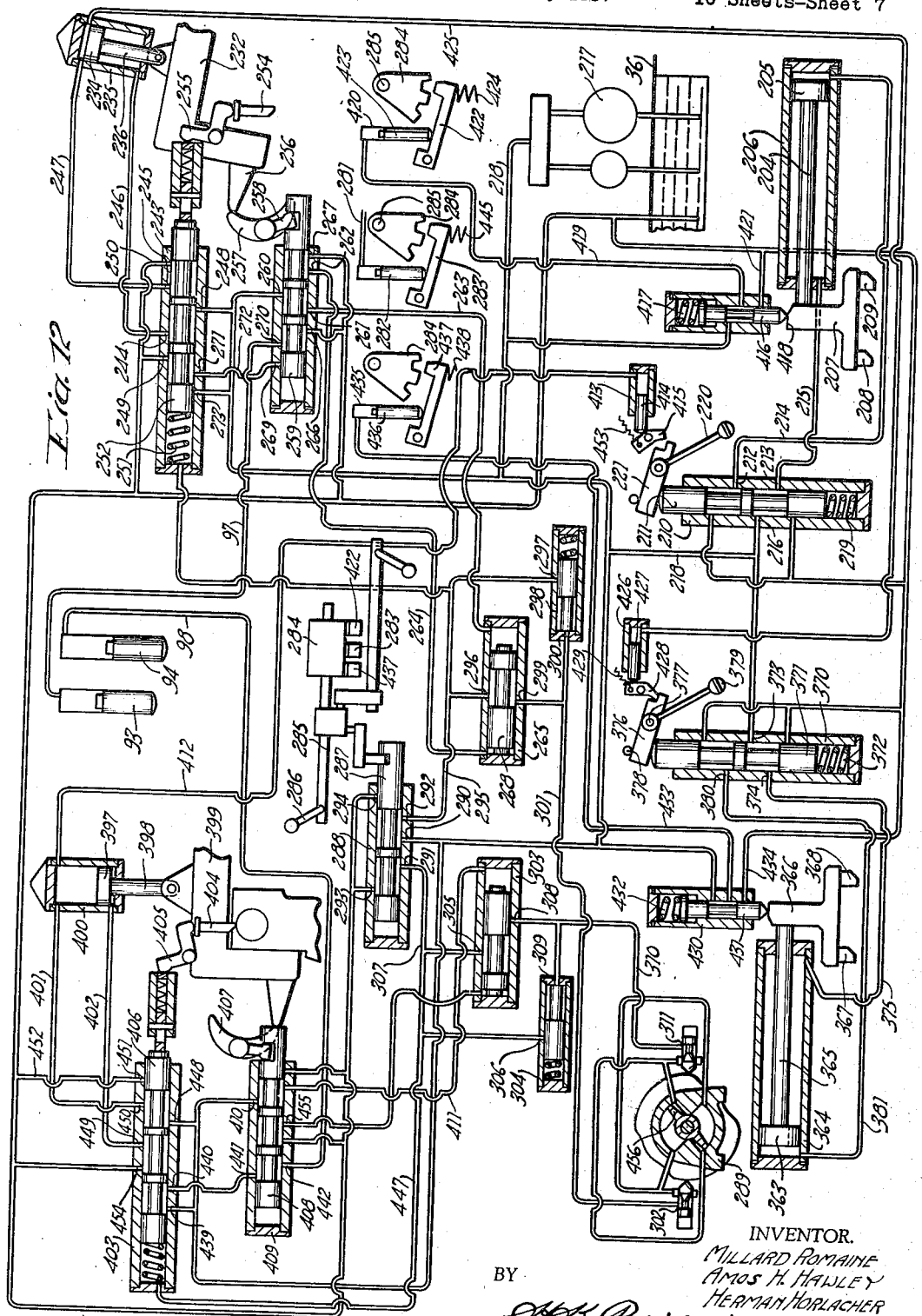

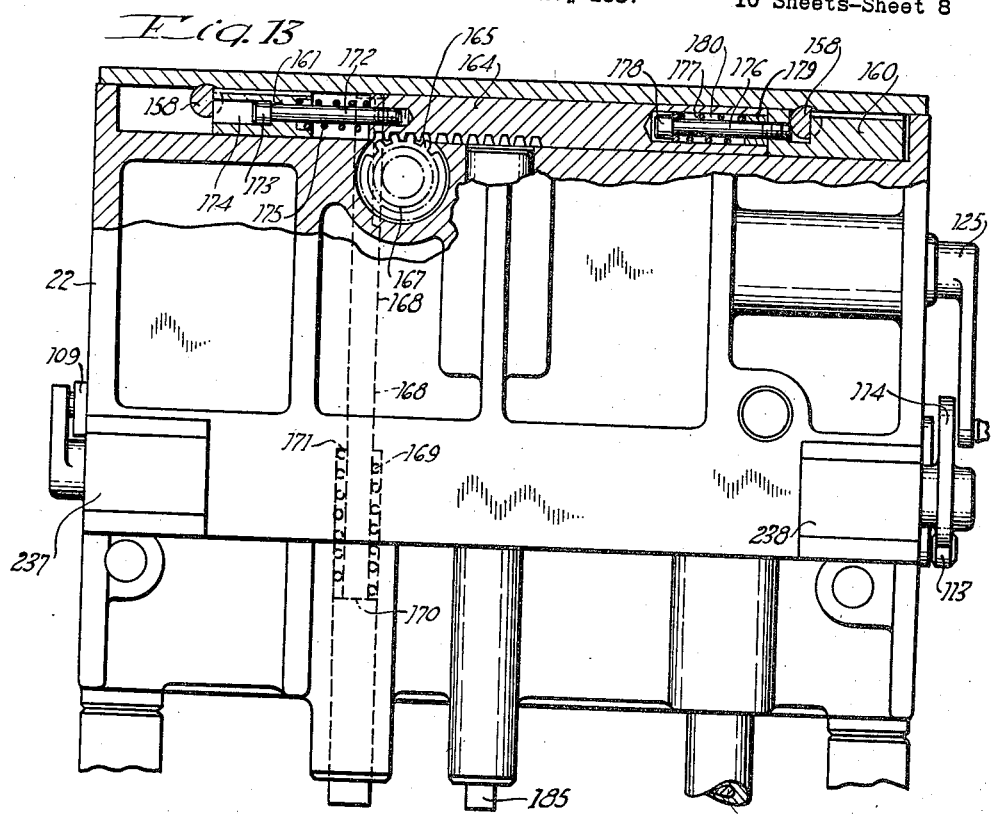
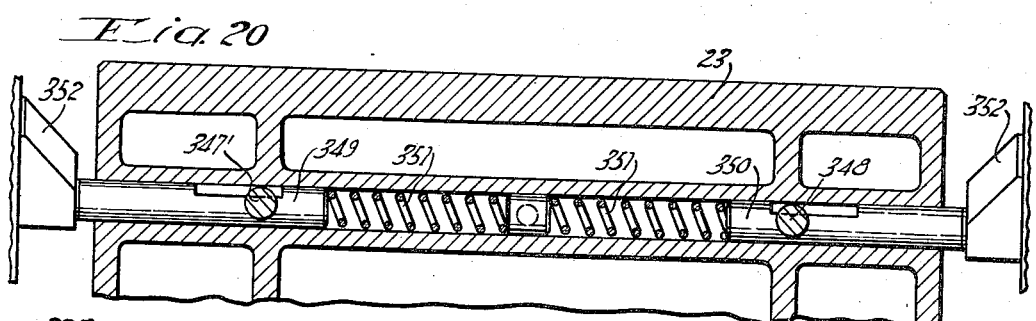
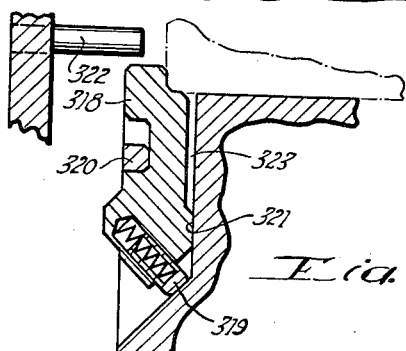

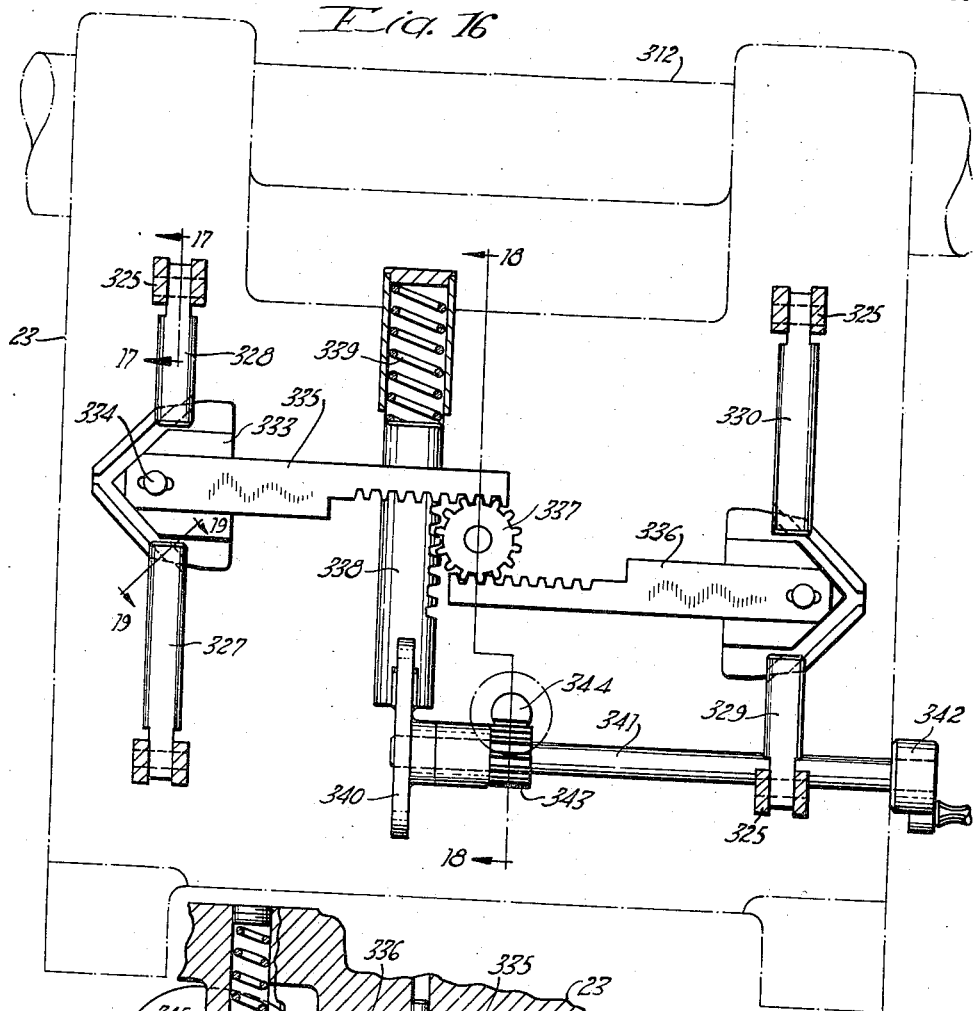
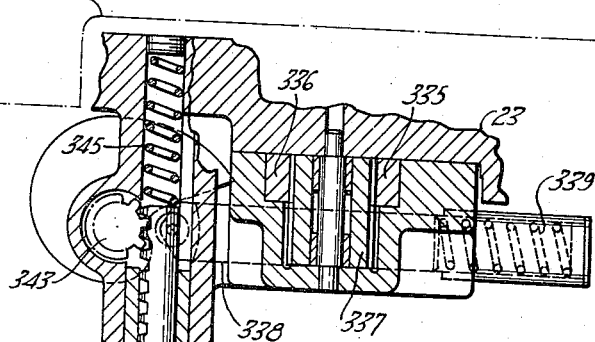

Patented June 18, 1940

2,205,277

UNITED STATES PATENT OFFICE 2,205,277

BROACHING MACHINE

Millard Romaine, Amos H. Hawley, and Herman Horlacher, Cincinnati, Ohio, assignors to The Cincinnati Milling Machine Co., Cincinnati, Ohio, a corporation of Ohio Application October 27, 1937, Serial No. 171,372

21 Claims. (Cl. 90—33)

This invention relates to machine tools and more particularly to improvements in broaching machines.

One of the objects of this invention is to improve the efficiency of surface broaching machines by arranging the work holders and tools in such a manner that broaching can be effected during both directions of ram movement.

Another object of this invention is to provide improved means for handling work at a broaching machine, whereby both sides of a work piece may be broached sequentially in a machine.

A further object of this invention is to provide an improved swinging work holder whereby the momentum of the work and holder during retraction from the broach is utilized to store energy for clamping the next work piece.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a broaching machine embodying the principles of this invention.

Figure 2 is a section on the line 2—2 of Figure 1.

Figure 3 is a detail section on the line 3—3 of Figure 1 showing the work transfer cradle.

Figure 4 is a section on the line 4—4 of Figure 3.

Figure 5 is a section through the lower work holder as viewed on the line 5—5 of Figure 2.

Figure 6 is a section on the line 6—6 of Figure 5.

Figure 7 is a plan view of the lower work holder as viewed on the line 7—7 of Figure 1.

Figure 8 is a detail section on the line 8—8 of Figure 7.

Figure 9 is a detail section taken on the line 9—9 of Figure 1 showing the work holder locking mechanism.

Figure 10 is a detail section on the line 10—10 of Figure 9.

Figure 11 is a diagrammatic view of the hydraulic actuating and control circuit for the broaching ram.

Figure 12 is a diagrammatic view of the hydraulic control circuit for governing movement of the work holders and work transferring mechanisms.

Figure 13 is a section of the lower work holder taken on the line 13—13 of Figure 7.

Figure 14 is an end elevation of the lower work holder showing same advanced to a 45° position.

Figure 15 is a view of the left work transfer mechanism.

Figure 16 is a section of the left, or upper, work locking mechanism.

Figure 17 is a view on line 17—17 of Figure 16.

Figure 18 is a view on line 18—18 of Figure 16.

Figure 19 is a view on line 19—19 of Figure 16.

Figure 20 is a sectional view of the backing-up plungers incorporated in the left, or upper, work holder.

Figure 21 is a sectional view through the work end stop of the upper work holder.

Briefly, this invention contemplates a horizontal type of surface broaching machine having a reciprocating cycle in the sense that broaching takes place in both directions of ram movement, together with separate fixtures for holding the work for the respective directions of broaching and a transfer mechanism located between the fixtures having the capacity for reversing the work when transferred from one fixture to the other whereby opposite faces of a work piece may be broached sequentially in the machine.

Referring to Figures 1, 2 and 11, the reference numeral 10 indicates the bed of the machine upon which is formed a pair of guide ways 11 and 12 for supporting and guiding a broaching ram 13 for horizontal movement. As shown in Figure 2, the broaching ram has a first or lower broaching tool 14 secured to the vertical face 15 of the ram and a second or upper broaching tool 16 secured to the vertical face of the ram, but in offset relation thereto as more particularly shown in Figure 1. In other words, the broaching tools overlap one another in the central portion of the ram, but each has a portion extending beyond the end of the other. Due to the nature of the work, the broaching tool 14 has a divided cutting face, or, in other words, has two sets 17 and 18 of cutting teeth, while the broach 16 has cutting teeth 19 and 20 arranged at right angles to one another, and an additional set of cutting teeth 21 aranged at an angle to the plane of the teeth 20. It will be obvious that the arrangement of teeth on each broaching tool could be varied to suit the nature of the work without departing from the principles of this invention.

The lower broaching tool is provided for broaching work mounted in the lower oscillatable work holder 22 which is located on the right side of the machine as shown in Figure 1, and the upper broaching tool is for broaching work carried by the upper oscillatable work holder 23 located on the left side of the machine. The teeth on the two sets of broaching tools are so arranged that they cut while moving in a direction toward the center of the machine and the two sets of broaching tools overlap one another a sufficient amount that when the end of the upper broaching tool 16 has just passed the right hand end of fixture 23 the lower broach tool 14 has just passed the right end of fixture 22 so that upon reversal of the ram the tool 14 is ready to begin cutting. The same thing is true at the other end of the stroke, that is, when the broaching tool 14 has completed its movement past fixture 22, the broaching tool 16 is in a position to begin cutting from the left hand of fixture 23.

The hydraulic circuit and control mechanism for effecting relative movement between the tools and work is shown in Figure 11. In the present machine the hydraulic cylinder 24 is formed integral with the ram 13 and the contained piston 25 is held stationary by virtue of connecting both piston rods 26 and 27 to the bed 10 of the machine. Hydraulic connections are effected to both ends of the cylinder by means of axial holes formed in the piston rods which intersect diametric holes adjacent each side of the piston 25.

Fluid is supplied to opposite ends of the cylinder through channels 28 and 29 which are connected to ports 30 and 31 respectively of a pilot controlled reversing valve 32. This valve has a central pressure port 33 which is supplied with fluid through channel 34 by a series of pumps 35 which withdraw fluid from a reservoir 36'. This valve also has a pair of exhaust ports 36 and 37 which are connected to a return channel 38.

When the valve plunger 39 is in the stop position in which it is shown, the pressure port 33 is closed and the motor ports 30 and 31 are isolated, whereby no movement of the ram can take place, but due to the large volume of oil that is being supplied by the pumps 35, means are provided in the plunger for by-passing this oil to reservoir freely rather than forcing this oil through a relief valve which would cause excessive heating of the oil. This means comprises an additional port 40 to which the pressure line 34 is connected by a branch line 41 and this port is connected by a cannelure 42 in the plunger to the exhaust port 36. Thus, delivery from the pumps is freely by-passed to reservoir without causing excessive heating thereof.

When the plunger 39 is shifted upward, as viewed in Figure 11, the pressure port 33 is connected to the motor port 31 and the motor port 30 is connected to the exhaust port 37, whereby the ram will move toward the right; and when the plunger 39 is moved downward, as viewed in Figure 11, the pressure port 33 is connected to the motor port 30 and the motor port 31 is connected to the exhaust port 36 whereby the ram will move to the left.

In order to prevent excessively high operating pressures developing in the cylinder a relief valve 43 has been provided. This valve is of an automatic trip type which when open will connect the pressure port to reservoir and which will remain open until manually reset by the operator. This valve has a pressure port 34 which is directly and continuously connected to the supply line 34 and this port is connected by an annular groove 45 in the plunger 46 to a passage way 47 which has one branch terminating in a cylinder 49 into one end of which projects the reduced end of plunger 46. From this it will be seen that whatever pressure exists in channel 34 will also exist in cylinder 49 and this pressure will be continuously acting to shift the plunger 46 upward. This movement is normally prevented by a locking plunger 49' which has a portion 50 fitting in a notch 51 cut in the side of the plunger 46.

The valve 48 has a spring 52 to determine the pressure at which the relief valve will be tripped. When this pressure has been reached the valve 48 will open and fluid will enter channel 54 which has one branch terminating in a cylinder 55 and the other branch connected to a hydraulic resistance 56, the other end of the resistance leading to reservoir. The sudden admission of high pressure into channel 54 will not escape immediately to reservoir due to the resistance 56 and pressure will immediately build up in the cylinder 55 and shift piston 57 which is connected to the locking member and thereby withdraw the same, whereby the pressure in cylinder 49 will shift the plunger 46 upward. The cannelure 45 in plunger 46 will then be in a position to connect port 44 to port 58 which is connected by channel 59 to the annular groove of exhaust port 37 whereby the fluid may be freely returned to reservoir.

When the emergency has passed the operator pushes on the upper end of the plunger 46 to relatch the same in the position shown.

The reversing valve plunger is hydraulically shifted into any one of its three positions and to this end the opposite ends of the housing are provided with cylinders 60 and 61 which are connected by channels 62 and 63 to ports 64 and 65 respectively of a pilot valve 66. A tubular plug 67 forms the inner end of each cylinder and a flanged bushing 68 is slidably mounted in the plug and the bushing is of such length that when pressure is admitted to both cylinders and the flanged ends of the bushings abut the ends of the plug as shown, the inner ends of the bushings will abut both ends of the plunger 39 and thereby move it and hold it in a central position.

The plunger 39 has reduced ends 69 which pass centrally through the bushings whereby when pressure is relieved in one cylinder the pressure acting on the other reduced end of the plunger will shift the plunger as well as the bushing to one of its extreme positions and thereby effect an operative connection to the cylinder.

The pilot valve 66 has a pressure port 70 to which fluid is supplied by a pump 71. When the pilot valve plunger 72 is in a central or stop position the pressure port 70 is connected by cannelure 73 in the plunger to both ports 64 and 65, whereby pressure is admitted to both cylinders 60 and 61 of the reversing valve and the plunger 39 is moved to a central position. When the plunger 72 is shifted to the right of the position shown, the port 70 remains connected to the port 64, while the port 65 is connected by a cannelure 74 to exhaust port 75 whereby the reversing valve plunger 39 is shifted upward. When the plunger 72 is shifted to the left the pressure port 70 remains connected to the port 65 and the port 64 is connected by cannelure 76 to exhaust port 77 with the result that the plunger 39 is shifted downward.

The pilot valve plunger 72 has a ball and socket connection 78 to a lever 79 which is keyed to a shaft 80 having a pinion 81 and an interlock plate 82 also keyed thereto. The pinion 81 meshes with a pair of rack plungers 83 and 84 which are mounted on opposite sides of the pinion, whereby when one moves up the other moves down. These plungers are offset in different planes whereby the trip dog that actuates one will not interfere with the other. A manually operable handle 85 is also keyed to the shaft 80 for shifting the pilot valve plunger in one direction or the other to start the machine, and also serves as an emergency stopping means. As shown in Figure 2, the dogs 86 and 87 which operate the trip plungers 83 and 84 are carried by the dog rail 88 attached to the top of the ram 13.

To prevent the operator from starting the ram moving in the wrong direction, the interlock plate 82 has been provided which has a pair of ears 89 and 90 which cooperate with pivoted bell cranks 91 and 92 respectively. These bell cranks are withdrawn from a locking position by fluid operable plungers 93 and 94 which are slidably mounted in cylinders 95 and 96 respectively. These cylinders are connected by channels 97 and 98 to the circuit shown in Figure 12 which controls the operation of the work fixtures. The manner in which this interlocking mechanism functions will be described later in connection with the operation of the work fixtures.

*Lower work fixture*

The lower work fixture is shown more particularly in Figures 2, 5, 6 and 7, and as shown in Figure 7, the fixture 22 is provided with two bosses 99 and 100 by which it is supported on a shaft 101. The fixture is oscillated by this shaft, but a separate driving member is provided for this purpose. As shown in Figure 2, the driving member comprises an annular ring 102 which has a pair of laterally extending ears 103 and 104 which engage wear plates 105 and 106 which are attached to the fixture. The member 102 is keyed at 107 to the shaft. Attention is invited to the fact that the plates 105 and 106 are for the purpose of forming a sliding connection between the driver 102 and the fixture since the driver is held against longitudinal movement with respect to the shaft, but the fixture is supported on the shaft by its trunnions 99 and 100 for limited movement relative thereto.

The work pieces, which in the present instance, are cylinder blocks, are fed to the fixture on a conveyor 108, a portion of which is shown in Figure 1. The fixture itself is provided with a drop bottom 109 which is pivotally supported at each end by a pair of links 110 and 111 which have one end pivotally connected to the bottom 109 and the other end pivotally connected to a fixed part of the fixture 22. The link 110 has an integral operating lever 112, in the end of which is mounted a roller 113 for engagement with the periphery of an operating cam 114. As shown in Figure 5, the link 110 is keyed to the end of a shaft 115 and this shaft extends the width of the fixture for actuation of link 116 which is keyed to the other end thereof. It will now be apparent that by rotating the lever 112 in a counterclockwise direction, as viewed in Figure 2, that the drop bottom 109 will be elevated and upon rotation of the lever in the opposite direction the drop bottom will be lowered. As shown in Figure 7, the drop bottom 109 is provided with a series of rollers 117 for facilitating movement of the work from the conveyor 108 into the fixture. When the fixture is down and the drop bottom is elevated the rollers 117 lie in substantially the same plane as the rollers of the conveyor. When the work is in position to be clamped in the fixture the drop bottom is lowered and the work is positioned and held in the fixture by other means.

The mixture is moved clockwise through an angle of 90 degrees from the position in which it is shown in Figure 2 to bring the work to a broaching position. As the fixture returns from the broaching position to the loading position, in which it is shown in Figure 2, the momentum of the fixture is utilized to operate a series of plungers which automatically unclamp the work and raise it in the fixture ready for removal, and in so doing it compresses springs associated with these plungers whereby upon the next movement to a cutting position the springs are automatically released to effect reclamping of the work without attention on the part of the operator.

The first of these plungers is shown in Figure 6 and consists of a rack plunger 118, which upon return movement of the fixture is in a projected position with respect to the fixture as shown in Figure 2, but during counterclockwise rotation of the fixture the roller 119, which is mounted in the end of the plunger, engages the top edge of a plate 120. As the fixture continues to rotate counterclockwise, the plunger is moved inward relative to the fixture and at the same time the roller travels along the top edge of the plate 120. By the time that the fixture has reached the end of its counterclockwise movement, the roller 119 has cleared the end of the plate 120. This upward movement of the plunger causes counterclockwise rotation of a pinion 121 keyed to a shaft 122, which shaft projects through the fixture and has the cam 114 keyed to the end thereof. This upward movement also causes counterclockwise rotation of a pinion 123 keyed to a shaft 124 which projects through the fixture and has a handle 125 keyed to the end thereof.

Counterclockwise rotation of the cam 114 rotates the lever 112 in a counterclockwise direction, thereby raising the drop bottom 109 into the plane of the conveyor 108 for reception of a new work piece therefrom. After the new work piece has been positioned in the fixture, the handle 125 is rotated in a clockwise direction to move the plunger 118 downward and thereby rotate the cam 114 in a clockwise direction and permit the drop bottom to fall by gravity.

It will be appreciated that due to the parallel links 110 and 111 that the bottom not only moves upward but sideways and it produces the same effect on the work, thereby lifting the same off the positioning members 126 which, as shown in Figure 5, is secured by set screws 127 to the rear wall of the fixture. These positioning or locating members are provided with taper bottoms 128 for engagement by tapered surfaces 129 formed on a backing-up or locking member 130 which is interposed between a shoulder 131 formed on the back wall of the fixture and the member 126. The member 130 is held in position by set screws 131' which pass through elongated slots 132 formed in the member 130 to permit longitudinal movement thereof, and an adjusting set screw 133 is threaded in the end of the member 130 in abutting relation to a lug 134 whereby upon rotation of the screw 133, the member 130 may be forced toward the left, as viewed in Figure 5, to form a solid backing for the members 126. A lock nut 135 may be provided on the set screw 133 for holding the parts in adjusted position.

The members 126 engage the underside of bosses 136 on the work to determine the vertical position thereof. The means for positioning the work laterally comprise a pair of equalizing plungers 137 and 138, which are shown in Figure 7, and they have their ends cut at 45 degrees for engagement with the ends of an equalizer bar 139. The ends of the members 137 and 138 are cut away on the underside as shown in Figure 6 to form a narrow work engaging surface 139'. Since this surface engages the rough edge of the casting, the provision of equalizing means permits the members 137 and 138 to relatively adjust themselves when lateral pressure is applied on the opposite side of the casting so that the axis of the casting may be lined up in parallel relation to the axis of the fixture.

A pair of positive stops or positioning members 140 and 141 are secured to the rear wall of the fixture as by screws 142 and each has an integral finger 143 projecting therefrom for engaging the lower part of the work and positively positioning the same vertically in the fixture. From Figure 6 it will be noted that the members 126 act as a fulcrum about which the work is free to rotate, but the members 137 and 138, which are on one side of the fulcrum, and the members 143 on the other side of the fulcrum prevent this rotation which results in a form of three-point support to align the work vertically in the fixture. One of the means for clamping the work into the fixture comprises a pair of bell cranks 144 which are pivotally supported on pins 145 carried by the rear wall of the fixture. The downwardly extending arms of these bell cranks have drilled holes 146 into which extends an equalizer bar 147 which has double tapered end portions 148 which fit into these holes and at the same time permit lateral movement of the bar 147 with respect to the plane of the bell crank. The bottom 109 is provided with a rearwardly extending lug 149 which engages the center of the member 147 and rotates the bell cranks in a counterclockwise direction.

The other arms of the bell cranks are adapted to enter holes 150 formed in the side of the work as the work moves laterally downward and then by counterclockwise rotation of the bell cranks, the lower end of the work is forced against the positive stop 143.

One of the means for applying lateral pressure on the work comprises a guide bar 151, which as shown in the plan view in Figure 7, has a double tapered lateral edge whereby its greatest dimension is in the middle at 152 and this bar is supported at each end by a pair of integral levers 152' which are pivotally supported on pins 153. The pins are carried by uprights 154 which are integral with the bottom 109 for movement therewith. The upper ends of the uprights are cut away to form a shoulder 155 which serve as abutments for the stop pins 157 carried by the levers 152'. These levers are continuously urged in a clockwise direction by suitable spring pressed plungers carried by the lower end of the levers 152' and engaging the side of the bottom 109. When no work is in the fixture the guide bar 151 is rotated until the pins 156 engage the shoulders 155. As the work piece moves into the fixture the guide bar serves to laterally urge the work towards the center of the fixture by a yielding lateral pressure. Also, as the bottom 109 moves laterally downward the bar 151 serves to yieldably push the work onto the positioning supports 126 and against the positive stops 143.

A pair of clamping plungers 158 are slidably mounted in the top of the front wall of the fixture and these plungers are partially beveled on the end to provide a clearance for the work engaging surfaces 159. The other ends of the plunger project into rectangular passageways 160 in which are slidably mounted shifter blocks 161. These blocks have an upwardly extending rib 162 which lies at an angle of 45 degrees to the direction of movement of the block and these ribs engage a slot 163 formed in the underside of plungers 158. Thus, as the block moves, the plunger 158 is positively moved in or out. The blocks are connected to an actuating rack 164 which is shifted by a pinion 165 rotatably supported on a pin 166. A second pinion 167 integral with the first pinion engages a vertically reciprocable rack plunger 168. As shown in Figure 13, the plunger 168 is continuously urged downward by a spring 169 which is interposed between a shoulder 170 formed on the plunger and a shoulder 171 formed in the bore in which the plunger slides. The block 161 is connected by a bolt 172 to the rack bar 164, but with lost motion in one direction because the head 173 of the bolt is free to slide in one direction in the enlarged hole 174. A spring 175 is interposed between the end of the rack bar 164 and the end of the block 161 whereby the block is continuously urged in a direction away from the end of the rack bar, but this movement is limited by the head 173 of the bolt 172.

The block 160 is connected by a bolt 176 to the end of the rack bar 164, but has lost motion in one direction due to the fact that a spring 177 is interposed between the head 178 of the bolt, and a bushing 179 fixed in the end of a hole 180 in which the head of the bolt slides. From this it will be seen that the spring 177 continuously urges the block 160 towards the end of the rack bar 164 and with the spring 175 continuously urges the block 161 in a direction away from the end of the rack bar 164. The block 160 is connected to the plunger 158 by the same means by which the block 161 is connected to the plunger. It will be noted that the ribs 163 on the blocks are positioned on the same side of the plungers as shown in Figure 7. Therefore, when the gear 165 is rotated in a counterclockwise direction, the rack bar 164 moves toward the left and resiliently urges the block 161 toward the left through the medium of spring 175 and resiliently holds the block 160 toward the left through the medium of spring 177. When the rack 165 is rotated in a clockwise direction, the lost motion between the heads of the bolts and the rack bar 164 is taken up and the blocks are positively returned to withdraw plungers 158.

The guide bar 151 is positively clamped against the side of the work by a plunger 181 which is slidably mounted in the front wall of the fixture in alignment with the bar 151 when the same is in its lowermost position. The plunger 181 is provided with a lateral groove 182 into which fits a rib 183 on a slidable block 184. The block is connected to an actuating plunger 185 which is continuously urged downward by a spring 186 interposed between a shoulder 187 formed on the plunger and a shoulder 188 formed in the bore in which the plunger slides. The rib 183 extends at substantially an angle of 45 degrees to the direction of movement of the block whereby upon downward movement of plunger 185 plunger 181 will be moved inward into engagement with the rail 151 and upon upward movement of the plunger 185, the plunger 181 will be retracted. A pair of backing up plungers 189 are reciprocably mounted in sleeves 190 which are fixed in the bottom portion of the frame of the fixture. These plungers have caps 191 secured to the end thereof which telescope the ends of the sleeve so as to prevent foreign material entering the bore of the sleeves and interfering with the operation thereof. The lower ends of the plunger are beveled for engaging beveled slots 192 formed in the top side of plungers 193. The plungers 193 are continuously urged toward the right, as viewed in Figure 6, by springs 194 which are interposed between the end of the plungers and the ends of the bore in which they reciprocate. When the fixture is down in the position in which it is shown in Figure 6, the ends of the plunger 193 abut a plate 194' and are thereby reciprocated toward the left to permit the backing up plungers 189 to drop out of engagement with the work and permit the same to be properly positioned and clamped in the fixture without interference therefrom.

The fixture, as a whole, operates in the following manner: After a new work piece has been placed in it, the operator rotates the handle 125 and the cam 114 is rotated in a direction to permit clockwise rotation of the operating lever 112 for the drop bottom. A spring pressed plunger 195 is reciprocably mounted in a bore 196 as shown in Figures 6 and 7. This plunger engages the side of the drop bottom 109 and is continuously urging the same into a downward position, whereby it will be apparent that upon rotation of the cam 114 in a counterclockwise direction the bottom 109 moves laterally downward until the rearwardly extending lug 149 engages the equalizer bar 147, whereupon the force of plunger 195 is transmitted to the bell cranks 144 to cause rotation thereof into engagement with the work. It will be noted in Figure 2 that there is a clearance between the roller 113 and the cam which thereby prevents any interference with the action of plunger 195 in rotating the bell cranks and thereby insures that the necessary movement is imparted to the bell cranks to bring them into engagement with the work.

As the fixture starts its clockwise rotation into broaching position, four spring pressed plungers start to move relative to the fixture to effect final clamping of the work. In other words, the plungers 193 start moving to the right relative to the fixture, as viewed in Figure 6, to raise the backing-up plungers 189; the plunger 185 moves downward to advance plunger 181 into engagement with the back of the guide bar 151; the plunger 168 starts to move downward to advance clamping plungers 158; and a plunger 197 starts to move downward to clamp the equalizing bar 139. As shown in Figure 6, the plunger 197 has a beveled face 198 which engages a beveled surface 199 formed on the equalizer bar 139, whereby downward movement of the plunger 197 clamps the equalizer bar 139 and thereby clamps the plungers 137 and 138.

When all of the plungers 197, 193, 185 and 168 have completed their movements, the work is held in a clamped position by the plungers 159 and the plunger 181, and the backing-up plungers 189 are in a position to prevent outward movement of the work under cut.

It will now be apparent that as the work fixture swings downward from its cutting position that the momentum of the fixture is absorbed in compressing the springs of the various actuating plungers as well as rotating the cam 114 against the resistance of plunger 195 whereby when the fixture comes to rest on the two supporting pedestals 200 and 201, the work will be in a position to be moved out of the fixture.

Attention is invited to the fact that the plungers 185 and 168 have V-shaped ends which engage properly positioned vertical plates 202 and 203 which have inclined surfaces so as to engage the plungers as they execute their arcuate movement due to rotation of the fixture.

Power operable means have been provided for moving the work from the conveyor 108 into the fixture 22 and this means comprises a hydraulically operated plunger 204 which has a piston 205 attached to the end thereof and contained in a cylinder 206. The plunger has an inverted T-shaped arm 207 attached to the end thereof and this arm carries two work engaging fingers 208 and 209 and arranged one in advance of the other so that the forward one will push the finished work piece out of the fixture and the rearward one will pull a new work piece into the fixture.

Referring to Figure 12, operation of plunger 204 is controlled by a reversing valve 210 having a spring pressed plunger 211. This valve has a pair of ports 212 and 213 which are connected by channels 214 and 215 to opposite ends of cylinder 206. Pressure is supplied to the port 216 of this valve by a pump 217 through channel 218. The plunger 211 is normally held in the position shown in Figure 12 by the spring 219, whereby the pressure port 216 is connected to port 213 and the plunger 204 is in a retracted position. Upon rotation of a manually operable lever 220, having an arm 221 in engagement with the end of plunger 211, the latter is moved to connect port 216 to port 212 and thereby cause the plunger 204 to advance the work. Upon release of the lever 220 the plunger 211 automatically returns to the position shown and causes retraction of the work pusher.

A positive stop is provided against which the work is positioned by the work pusher, and this mechanism is shown more particularly in Figures 7 and 8. The stop member 222 has an elongated slot 223 formed in one end for embracing a supporting rod 224, which has collars 225 fixed therewith on opposite sides of member 222. The rod 224 is fixed at opposite ends in the drop bottom 109 for movement therewith.

The member 222 also has a square slot 226 formed in the upper side thereof through which passes a second rod 227. A spring 228 is mounted in an angular bore formed in the member 222 and has one end fixed with the member and the other end fixed with the rod 227, whereby the spring continuously urges the member 222 in a counterclockwise direction about the rod 224 as a center. It will be noted that the spring also acts at the required angle to normally urge the member 222 toward the right, as viewed in Figure 8, to thereby take up the lost motion between the two slots and the respective pins passing therethrough. It should now be evident that when the drop bottom 109 moves downward to such an extent that the shoulder 229 on the stop passes out of engagement with the end of the work piece, that the spring 228 is free to shift the stop member 222 toward the right. This will occur automatically because the drop bottom 109 is lowered by rotation of the hand lever 125, as previously explained, after the work has been placed in the fixture. Since the stop member 222 is now retracted, it will be evident that when the drop bottom frame 109 is automatically raised by the plunger 118 during counterclockwise return movement of the fixture to a loading position, the stop member 222 will come up under the work piece, and thus it will not interfere with the removal of the finished work piece, but as soon as the finished work piece has passed out of the fixture, the stop will move into position under the urge of spring 228 so that the next entering work piece will engage the shoulder 229 and thereby shift the stop member 222 toward the left until the face 230 on the stop member engages the surface 231 on the drop bottom frame 109, which serves as a positive means for determining the position of the work.

It will now be evident that during downward movement of the drop bottom 109, the stop member is retracted a sufficient amount that when the frame 109 is again raised the stop will not interfere with the present piece of work in the fixture but will reappear to stop the movement of the next work piece inserted in the fixture.

The fixture is held in a cutting position by a pivoted fixture lock 232. This lock is supported on a rod 233, which, as shown in Figure 2, is carried by the frame of the machine. It is moved up and down by a piston 234 which is slidably mounted in a cylinder 235 and connected by a piston rod 236 to the locking member.

The fixture is provided with two radially extending lugs 237 and 238 which have a straight face 239 on one side for engaging straight faces 240 formed on the frame of the machine and forming a fixed part of the locking mechanism. The other face 241 of the lug is tapered with respect to the face 239 for engagement by the tapered faces 242 carried by the lock 232. When the fixture has been swung clockwise into its broaching position with the faces 239 abutting the faces 240, the locking member is swung counterclockwise downward whereby the tapered faces 242 on the locking member engage the tapered surfaces 241 on the fixture and thereby lock the same into its broaching position.

Located in bore 500 of fixture lock 232 is a spring pressed plunger 501 having a cam surface 502 for engagement with cam surface 503 formed on lug 237, see Figures 9 and 10.

As fixture lock 232 swings downward into locking position the plunger 501 actuates the entire fixture 22 against the end stop 504 mounted on upright 505. In this manner the thrust of the cut is transmitted to the bed of the machine.

When fixture 22 is actuated downward or to the loading position, cam 506 on upright 505 engages cam 507 on the fixture to actuate same to the right as seen in Figures 1 and 7.

The admission of fluid pressure to the locking cylinder 235 is controlled by a reversing valve 243 which has a pair of ports 244 and 245 which are connected by channels 246 and 247 respectively to opposite ends of the cylinder. This valve also has a pressure port 248 located between ports 244 and 245 and a pair of exhaust ports 249 and 250. A spring 251 normally urges the valve plunger 252 of this valve into a position in which the pressure port 248 is connected to the port 244, whereby the lock is held in an upward or unlocking position.

The fixture automatically effects its own locking which is accomplished by providing a pin 253 in the side of lug 237, whereby as the fixture reaches its final position it actuates a plunger 254 which is operatively connected by a bell crank 255 to the lock control valve 243 for shifting the plunger 252 into a position connecting pressure port 248 to port 247. Fluid now flows to the upper end of cylinder 235, moving the piston 234 and connected lock 232 downward.

As the locking member 232 moves downward, a finger 256 rotates a trip lever 257, which, through an integral crank arm, 258, shifts a plunger 259 of an interlock control valve. This valve has a pressure port 260, a pair of ports 261 and 262 which are connected by channels 263 and 264 respectively to opposite ends of an interlock valve 265. The valve also has a pair of return ports 266 and 267. In the position shown, the pressure port 260 is connected to port 261 and port 262 is connected to the return port 267, but upon rotation of the trip lever 257 in a clockwise direction, the pressure port 260 is connected to port 262, whereby the plunger 268 of the interlock valve 265 is shifted to a right hand position. Valve plunger 259 also interconnects a pair of ports 269 and 270, whereby port 271 of the locking cylinder control valve 243 is connected through channels 272 and 97 to the interlocking cylinder 95 associated with the broaching ram control mechanism shown in Figure 11. Since the plunger 252 is shifted to the left, the port 271 is connected to a second pressure port 273 in valve 243, whereby the plunger 93 in cylinder 95 is shifted downward to rotate the interlocking bell crank 91 out of locking position, permitting manual rotation of the hand lever 85 in a clockwise direction. This will shift the pilot control reversing valve 32, causing admission of fluid pressure to the left hand end of cylinder 24 and thereby movement of the broaching ram to the left. When the ram reaches the end of its cutting stroke, a trip dog actuates the rack plunger 84 and shifts the pilot valve to a stop position, thereby stopping the ram. At the same time, a dog 274 shifts a spring pressed valve plunger 275 into a position interconnecting a port 276 with a port 277. The port 276 is connected by channel 278 to a port 279 of the pilot valve 66. When the pilot valve is shifted to a stop position, the port 279 is interconnected with a pressure port 280.

The port 277 is connected by a channel 281 to an interlock plunger 282. Pressure actuation of this plunger removes a locking pawl 283 from engagement with a notched locking segment 284 secured to the shaft 285. The shaft 285 has a manually operated lever 286 secured thereto for rotating the shaft and thereby cause shifting of a valve plunger 287 of a reversing control valve 288 for the indexing hydraulic motor 289. This valve has a pressure port 290 and a pair of motor ports 291 and 292, and a pair of exhaust ports 293 and 294. The port 292 is connected by channel 295 to port 296 of the interlock valve 265 and also to port 297 of a check valve 298. These valves have ports 299 and 300 respectively which are connected by channel 301 to port 302 of the hydraulic motor 289.

The port 291 is similarly connected to the other port of motor 289, there being an interlock valve 303 and a check valve 304 which have ports 305 and 306 respectively connected by channel 307 to port 291; and ports 308 and 309 respectively connected by channel 310 to motor port 311.

Since additional interlocks must be removed before the lever 286 can be operated to effect actuation of the motor 289, further description of the control mechanism for the motor will be deferred for the present.

Upper work fixture

The upper work fixture 23 is fixed for rotation with shaft 312 which is journaled at opposite ends in uprights 313 and 314. This shaft has a gear segment 315 fixed to one end thereof, and as shown in Figure 3, this gear segment intermeshes with a gear segment 316 which is keyed to the motor shaft 101. Since the lower fixture is directly moved by the shaft 101, it will be apparent that upon rotation of the shaft, one fixture will move clockwise while the other fixture is moving counterclockwise. The two fixtures are connected to the shafts in a 90 degree phase relationship, whereby when one fixture is in a cutting position the other fixture is in a loading position and vice versa.

The upper fixture has a plain work receiving surface 317 as shown in Figure 2 for supporting the work and it will be noted that the top surface of the work which was finished in the first broaching operation serves as the supporting face of the work when it is transferred into the second fixture.

When the work moves into the fixture it engages an end stop 318 which is normally held up into a stop position by a spring pressed plunger 319 acting at an angle of 45 degrees and a fixed plate 320 is provided for limiting the upward movement of the end stop, as well as taking the thrust of the endwise movement of the work when it engages the stop. As a matter of fact, the member 320 serves as a fulcrum for the end stop, the work tending to rotate it in a counterclockwise direction, but the heel 321, located below the member 320, prevents this rotation.

When the fixture moves upward to cutting position a pin 322 is fixed in the upright 313 in a position to engage the end stop just before the fixture reaches its final position and moves the same longitudinally until the end stop is below the underside of the work piece, whereby the spring pressed plunger will rotate the stop about the bar 320 and due to the reduced portion 323, the end stop will rotate to a position underneath the work, whereby when the fixture is returned to a loading position the work piece may pass out of the fixture without interference from the end stop.

The lateral position of the work is determined by a fixed rail 324 positioned to engage the side of the work piece near the top thereof.

The work is clamped to the surface 317 by four clamps 325 which are pivotally supported on the fixture and positioned to engage portions of the flange 326 of the work, there being two clamps on each side of the work and located near the ends thereof. Four actuating rods 327, 328, 329 and 330 are reciprocably mounted in the fixture for actuating the individual clamps. The actuating rods 327 and 328 are provided with grooves 331 in the abutting ends thereof for engagement by ribs 332 carried by the cam member 333. This member is connected by a pin 334 to an actuating rack 335. A certain amount of lost motion is provided between the pin and the rack so as to equalize the pressure between the clamping members at one end of the fixture, and those at the other end of the fixture. The member 333 also has a certain amount of lateral lost motion so as to equalize the pressure between the pair of clamping members at one end of the fixture. In this manner the pressure of all four clamps is equalized. The rack member 335 and a second rack member 336 which actuates the rods 329 and 330 through the same cam mechanism interengage a pinion 337 which is rotatably mounted in the center of the fixture and in mesh with a rack bar 338 which extends at right angles to the rack bars 335 and 336. A spring 339 is mounted in a blind hole behing the rod 338 to continuously urge the same in a direction to effect clamping.

A cam 340 is rotatably mounted in the fixture opposite the end of rack bar 338 on a shaft 341. The shaft extends beyond one end of the fixture and is provided with an operating handle 342. The shaft 341 has a pinion 343 which intermeshes with rack teeth formed on a rod 344 which is normally urged in one direction by a spring 345. This mechanism is similar to the mechanism shown in the first fixture and the end of the rod 344 is provided with a roller 346 whereby as the fixture comes down to a loading position, the end of the roller will impinge on the edge of a plate 347 and thereby compress the spring 345, causing rotation of the cam 340 and longitudinal movement of the rack bar 338 against the compression of spring 339 to effect release of the four clamping members 325. Due to the tongue and groove connection between the actuating rods 327 to 330, inclusive, and the operating cams 333, the rods will be positively retracted by rotation of the cam 340 in a counterclockwise direction.

After the finished work has been removed, and a new work piece has been inserted, the operator actuates the handle 342 to rotate the cam 340 in a clockwise direction, thereby permitting the spring 339 to actuate clamps and secure the work.

Since the work is being broached on two right angular surfaces, while in this fixture, a pair of backing-up plungers 347' and 348 are provided in the wall of the fixture between the rail 324 and the bottom of the fixture to take the thrust of the broaching teeth 20. These stops have tongue and groove connections with actuating rods 349 and 350 supported for reciprocation in right angular relation to the movement of members 347' and 348 and springs 351 are interposed behind the rods 349 and 350 normally urging them in a direction toward the work. When the fixture moves counterclockwise downward to a loading position, cam blocks 352 are provided on the sides of the uprights 313 and 314 to cam the members 349 and 350 toward one another and thereby positively withdraw the backing-up stops 347 and 348, whereby the work may be changed without interference therefrom.

A plunger for actuating fixture 23 against stop 508 is similar to plunger 501 in locking member 232 and, therefore, is not shown in detail.

It will now be apparent that, as in the first fixture, the kinetic energy of the moving fixture as it returns to loading position is utilized to effect unclamping of the work and in so doing, loads a spring which may be subsequently released at the will of the operator to reclamp the work.

Work roll-over mechanism

Means have been provided for transferring the work from one fixture to the other and at the same time turning the work over so that the surface which was broached while the work was in the first fixture is utilized as a supporting surface for the work while in the second fixture, whereby other surfaces on the work, which were inaccessible while the work was in the first fixture, may be broached. Referring to Figures 1 and 3, a work receiving cage 353 is supported on the end of a shaft 354 and in eccentric relation thereto whereby when the cage is in the position shown in Figure 3 the top surface of the rollers 355 are substantially in the plane of the rollers of the first fixture 22, whereby work may be readily transferred from one to the other.

A second set of rollers 356 is provided in the cage and located co-axially with the axis of shaft 354, whereby upon rotation of the cage, the work will be supported on the top of the rollers 356 and substantially in the plane of the second fixture for transfer thereto.

As viewed in Figure 1, the cage 353 is rotated in a counterclockwise direction from its lower position to its upper position. In order to prevent the work falling out of the fixture while it is being rotated, a large plate 357 is attached to one end of the cage. The cage is rotated by the same motor that rotates the fixtures and to this end the shaft 354 is provided with a spiral gear 358, which as is shown in Figure 4, intermeshes with a spiral gear 359 keyed to shaft 360. This shaft has a bevel gear 361 secured to the end thereof which intermeshes with a partial bevel gear 362 fixed with shaft 354. Since the cage is integrally connected with the shaft 354 it will be apparent that it rotates in synchronism with the fixtures and is so connected that it is in its lower position when the first fixture is in a loading position, and in its upper position when the second fixture is in its loading position.

Power operable means are provided for transferring the work from the cage to the second fixture and comprises a piston 363 contained in a cylinder 364 and connected by a piston rod 365 to an inserted T-shaped arm 366 which carries at each end a pair of work engaging fingers 367 and 368. The fingers are sufficiently spaced so that when the piston is moved to its extreme right hand position the finger 368 will engage the work piece that is in the cage and the finger 367 will engage the work piece that is in the fixture 23; whereby upon movement of the piston 363 to the left, the finished work piece will be removed and a semi-finished work piece will be inserted in the fixture. The finished work piece passes out onto a conveyor 369 which is located in the plane of the floor of the fixture 23 when the same is in a loading position.

Operation of piston 363 is controlled by a valve 370 having a plunger 371 which is normally positioned by a spring 372 in a position to connect a pressure port 373 to port 374 which is connected by channel 375 to the right hand end of cylinder 364, thereby holding the cylinder 363 in its extreme position. A lever 376 is pivotally mounted at 377 in such a position that the end of the lever engages the end of a plunger and a stop 378 is provided to limit the outward movement of the plunger by spring 372. A manually operable handle 379 is attached to the lever for rotating the same to cause movement of the plunger 371 against the action of the spring and connect pressure port 373 to port 380 which is connected by channel 381 to the left end of cylinder 364.

When the operator actuates the lever 379 to shift plunger 371 and thereby connect pressure fluid to the left hand end of cylinder 364, the piston 363 moves toward the right and the work engaging fingers 367 and 368 are free to move in a clockwise direction about the pivot pins 382 as they pass over the work pieces that are in the fixture and in the roll-over cage. The fingers are mounted in bifurcations whereby a shoulder 383 is formed for preventing counterclockwise rotation of the finger 367 and a spring pressed plunger 384 normally holds the finger against this shoulder. The finger 368 is normally held in the position shown by a spring pressed pawl 385 which engages a notch 386 formed in the top of the finger 368, the notch having a shoulder 387 which engages the pawl and thereby prevents counterclockwise rotation of the finger after it engages the work. The notch is so shaped that after clockwise rotation, as when the finger is rotated by the work during movement toward the right, the pawl will reset the finger in proper position to engage the work. The pawl 385 is pivoted at 388 and is provided with an elongated tail 389 in the end of which is mounted a pin 390. A spring pressed plunger 391 continuously acts to rotate the pawl 385 in a clockwise direction to cause engagement of the nose of the pawl with the notch 386. When these parts are in contact the tail 389 is up as shown in Figure 15, and this is the position of the parts when the work pushers start moving the work toward the left. When the work piece hits the positive stop in fixture 23 the pin 390 engages a cam surface 392 and rotates the pawl 385 in a counterclockwise direction, thereby releasing the finger 368 so that the parts can continue their movement to a position which is out of the path of the fixture when it rotates upward to a cutting position. Since the head 366 is attached to the end of the piston rod 365, means have been provided for preventing rotation of the parts comprising a rectangular bar 393 which is attached to the top of the head 366 above the piston rod and this bar is slideable in guides 394 and 395 fixed with the cylinder.

It will now be apparent that by rotating the lever 379 the operator can cause power movement of the parts to pick up two work pieces and then by releasing the lever, the spring 372 returns valve 371 to a position to cause movement of the work pusher to the left and during that movement the finger 368 is automatically released when the work engages the parts to stop so that the work pusher can continue its movement a sufficient distance to clear the fixture.

The work fixture 23 is provided with a hydraulic locking and control mechanism which is similar to that used for locking the first fixture in cutting position, and, as shown in Figure 12, comprises a piston 397 which is connected by piston rod 398 to a locking member 399. The piston 397 is contained in a cylinder 400 which has its opposite ends connected by channels 401 and 402 to a reversing control valve 403. This valve is operated by a plunger 404 and intervening bell crank 405, whereby when the fixture 23 reaches a cutting position it will shift the plunger 406 of valve 405 and thereby reverse the pressure connections to valve 403 to cause downward movement of piston 397. The lock member 399, as it moves downward, operates a double-ended trip lever 407 which is operatively connected to a valve plunger 408 of valve 409 to thereby connect a pressure port 410 to channel 411 which operates the interlock valve 303.

When pressure is connected to the upper end of cylinder 400 to actuate the lock 399, a connection is made through channel 412 to an interlock cylinder 413 which has a plunger 414 movable under the hydraulic pressure to remove a latch lever 415 from the path of control lever 221 of valve 210. This lever, which is operable by handle 220, controls the work loading piston 205 for the first fixture. Thus, when the second fixture is locked in cutting position, the first fixture will, of course, be down in a loading position, and since the interlock 415 has been removed, it is possible for the operator to load the first fixture during the time that the broaching operation is being performed on the work in the second fixture. Also at this time the work roll-over cage 353 will be in its lower position as shown in Figure 3 so that not only is a new work piece loaded in the first fixture but the semifinished work piece in the first fixture is simultaneously loaded into the cage 353.

When the piston 205 starts its reciprocatory movement it is supporting in raised position an interlock valve plunger 416 which is continuously urged in one direction by a spring 417 so that when the cam surface 418 moves from under the plunger, said plunger is shifted downwardly to connect channel 419 leading from an interlock cylinder 420 to the reservoir line 421. The result is that a pawl 422 which has been held out of engagement with the interlock plates 284 by plunger 423, which is mounted in the cylinder 420, is returned to locking engagement with the interlock plate by a spring 424. It will be remembered that the member 284 is secured to the shaft 285 which has the operating handle 286 for shifting the reversing valve of the fixture motor with the result that it will be impossible to operate this valve during the loading of the fixtures.

Since the second fixture is in a cutting position, means have been provided for preventing the operation of the second work loading mechanism, and therefore, the upper end of cylinder 235 is connected by channel 425 to an interlock cylinder 426 which has a plunger 427 operating on an interlock pawl 428. A spring 429 continuously urges this pawl into interlocking engagement with the end of lever 376, and therefore, when the upper end of cylinder 235 is connected to exhaust no pressure will be present in cylinder 426 and the interlocking pawl can move into position under the action of spring 429 to prevent actuation of lever 376 and thereby prevent actuation of the work loading mechanism of the second fixture while the second fixture is in cutting position.

It will be obvious that when pressure is admitted to cylinder 235 to lock the first fixture in cutting position that pressure will be present in channel 425 and the interlock will be removed from the control valve 370 so that the second work loading mechanism may be operated while the work in the first fixture is being broached.

When the second work loading mechanism is being utilized, a hydraulic interlock valve 430 is provided so that during advance and retraction of piston 363, the valve plunger 431 will be moved downward under a spring 432 to connect channel 433 to reservoir line 434. The channel 433 leads to cylinder 435 in which is reciprocably mounted a plunger 436 for removing an interlock pawl 437 from the segment 284. When the channel 433 is connected to reservoir, a spring 438 returns the pawl 437 into locking engagement with the member 284. It will now be apparent that three different interlocking pawls are mounted in adjacent relation to the interlocking segment 284 fixed on the shaft 285 so that if any one of these are in locking position it will be impossible for the operator to shift the reversing valve for the hydraulic motor.

*Operation of the machine*

The operation of the machine will be briefly summarized, and assuming as a starting point that the various parts are in the position shown in Figure 1, that is, with the second fixture in a cutting position, the first fixture in a loading position, the work roll-over cage 353 in its lower position, the broaching ram 13 ready to start movement toward the right to effect a cutting stroke by the broaching tool 16 and a return or non-cutting stroke of the broaching tool 14.

The various valves in the hydraulic circuit are in the position shown in Figure 12. This means that the pressure port 439 of valve 403 is interconnected with port 440 so that pressure flows to port 441 of valve 409. Due to the position of this valve, pressure port 441 is connected to port 442 and thereby to channel 98, thereby actuating interlock plunger 94 and removing the interlock bell crank 92 as shown in Figure 11. This permits the operator to throw the manual control lever 85 in a counterclockwise direction and thereby connect pressure port 70 to port 64, thereby shifting the reversing valve plunger 39 upward so that the right hand end of cylinder 24 is supplied with pressure through the interconnection of port 33 and 31 and the left end of cylinder 24 is connected to reservoir through the interconnection of ports 30 and 37. This will cause movement of broaching ram 13 to the right as viewed in Figure 1.

The broaching ram starts to move and dog 274 passes out from beneath plunger 275, whereby a spring 443 shifts the plunger 275 downward to interconnect channel 281 to the reservoir line 444. Channel 281 is connected to the interlock plunger 282 and since this is now connected to reservoir, a spring 445 moves the interlock pawl 283 into engagement with member 284. Thus, as soon as the ram starts to move, an interlock is applied to the fixture motor control valve to prevent inadvertent actuation thereof.

During the broaching stroke the interlock has been removed from lever 220, whereby the work loading mechanism associated with the first fixture may be utilized to remove the work from the first fixture into the cage and advance a new work piece from the conveyor into the first fixture.

When the broaching ram reaches the end of its cutting stroke, a dog will shift the rack plunger 83, shown in Figure 11, upward, thereby returning the pilot valve 72 to a central position which will reposition the reversing valve to a center position and stop movement of the broaching ram. At this time a dog 446 has shifted plunger 275 upward to connect the pressure port 276 to port 277 and thereby to channel 281 which removes the interlock pawl 283. When the first fixture has been loaded and the piston 205 has returned to a starting position, a second interlock pawl 422 is removed from engagement with the member 284, whereby the hand lever 286 may now be actuated to shift the reversing valve plunger 287. At this time, the plunger 287 will be shifted toward the right from the position shown in Figure 12 and thereby interconnect pressure port 290 to port 291. Since the plungers of both the interlock valve 303 and the relief valve 304 are in a position to block flow to the fixture motor 289, the pressure will build up in channel 307 to act through branch line 447 on the left hand end of plunger 406 of reversing valve 403 which, at this time, is being held in a left hand position by the fixture 23. It will be noted, however, that there is a lost motion connection between the plunger 406 and the operating bell crank 405. This lost motion connection permits the plunger 406 to be shifted toward the right to thereby connect pressure port 448 to port 449 which is connected by channel 402 to the lower end of cylinder 400. Also, ports 450 and 451 are interconnected so that channel 401 leading from the upper end of cylinder 400 is connected to the reservoir line 452. This not only permits the fluid from the upper end of cylinder 406 to be exhausted to reservoir, but also connects the interlock cylinder 413 to reservoir, whereby a spring 453 will reposition the interlock pawl 415 and prevent actuation of the control lever 220 for the work loading mechanism of the first fixture.

Piston 397 now moves upward, unlocking the fixture 23 and at the end of this upward movement, throws the trip lever 407 and shifts valve plunger 408 to the right. When valve plunger 406 was shifted to the right it connected port 440, which led to the interlock plunger 94, to reservoir port 454, thereby replacing the interlock bell crank 92 shown in Figure 11; and when the plunger 408 is shifted to the right it disconnects port 442 from port 441, whereby the interlock plunger 94 is now disconnected from the circuit.

In addition, when plunger 408 is shifted to the right it connects the pressure port 410 to port 455, thereby shifting the plunger of interlock valve 303 to the right and effecting interconnection of ports 305 and 308, whereby pressure fluid in channel 307 may now flow to the hydraulic motor 289. This motor is a vane type motor and is similar to that shown in co-pending application, Serial Number 152,200, filed July 6, 1937. When pressure is admitted to this motor the vane 456 moves counter-clockwise and since it is attached to the end of shaft 101, the shaft 101 will rotate counterclockwise, thereby moving the fixture 22 upward to a cutting position; rotate the cage 353 to its upper position; and rotate the fixture 23 downward to a loading position.

As soon as the fixture 23 starts to move downward, the pressure on the right hand end of the plunger is released, but the plunger is already in a right hand position with the result that when the pressure is cut off from channel 447 it will still remain in that position.

As fixture 23 is moving down, fixture 22 is moving up due to the rotation of the hydraulic motor and near the end of its upward movement will shift the valve plunger 252 to connect pressure port 248 to port 245 and thereby cause downward movement of the locking lever 232. Admittance of pressure to channel 247 also supplies pressure to cylinder 426, thereby removing the interlock on control lever 379 which permits operation of the work ejecting mechanism associated with the second fixture. The lower end of cylinder 235 is connected to reservoir through the end connection of ports 244 and 249. Port 273 is also interconnected with port 271, thereby rendering port 269 associated with valve plunger 259 a pressure port, whereby upon shifting of this plunger, upon completion of the movement of locking lever 232, this port will be connected to channel 97 to actuate plunger 93 and thereby remove the interlocking bell crank 97 from the ram starting lever. At the same time, shifting of plunger 259 to the right interconnects pressure port 260 to port 262 and thereby shifts the interlocking plunger 268 to the right, disconnecting port 299 from 296 whereby the return flow from the hydraulic motor is blocked to stop rotation of the motor. The relief valve 298 connected in parallel with the interlock valve 265 permits a slight additional movement of the motor in case the fixture is not solidly against the pads 240.

Since the interlock plunger 97, shown in Figure 11, has been removed, the operator may now shift the lever 85 to the left to cause return movement of the broaching ram to effect cutting of the work in fixture 22.

What is claimed is:

1. In a broaching machine having a surface broaching tool and a swinging work fixture movable from a loading position to a cutting position, the combination of resiliently operable work clamping means carried by the fixture and operable to secure a work piece in position in the fixture during the broaching operation, and means responsive to movement of the fixture to a loading position for compressing said resiliently operable means and thereby releasing the work.

2. In a broaching machine having a broaching tool and a work supporting fixture movable from a loading position to a cutting position, the combination of a plurality of pivoted work clamping members carried by the fixture, resilient means for holding said clamping members in engagement with the work, and means to utilize the kinetic energy of the moving fixture for releasing said clamps.

3. In a broaching machine having a work supporting fixture movable from a loading position to a cutting position, the combination of a plurality of positioning and clamping means carried by the fixture and operable to secure a work piece in position in the fixture during the broaching operation, means to utilize the potential energy of the fixture while in a loading position to hold said means retracted in order to permit loading of work in the fixture, said means being releasable after a predetermined movement of the fixture whereby the work will be clamped during movement of the fixture from a loading to a cutting position.

4. In a broaching machine having a broaching tool and a work supporting fixture movable from a loading position to a cutting position, the combination of means in the fixture for clamping the work, a plurality of jacks mounted in the fixture for absorbing one component of the cutting force of the broaching tool, and means for automatically positioning said jacks during movement of the fixture to its cutting position.

5. In a broaching machine having a broaching tool and a work fixture movable to and from a cutting position with respect to said tool, the combination of fluid operable means for locking said fixture in its cutting position and absorbing one component of the cutting force, a fixed member positioned to be engaged by the work for absorbing the other component of the cutting force, and means operable by the locking means for shifting said fixture to effect engagement of the work with said fixed member.

6. In a broaching machine having a broaching tool and a work fixture movable from a loading position to a broaching position, the combination with an hydraulic motor for moving said fixture and a power operated work loader for said fixture, of an interlock to prevent operation of said motor during actuation of said work loader.

7. In a broaching machine having a broaching tool and a work supporting fixture movable to and from a broaching position with respect to said tool, the combination of power operated means for moving said fixture, means to lock said fixture in a broaching position, an hydraulically operated motor for actuating said locking means, a control valve for said hydraulic means, means operable by the fixture during movement to a broaching position for actuating said motor, and means trip operable by the locking means for stopping said means for moving the fixture.

8. In a broaching machine having a pair of broaching tools and a pair of work fixtures alternately movable into cutting position to present work to the respective tools, the combination of power operable means for simultaneously moving said fixtures in opposite directions whereby only one fixture is in a cutting position at a time, power operable work loaders associated with each fixture, controls for each work loader, interlocks associated with each control, and means operable by one fixture when in a cutting position to remove the interlock on the control for the work loader of the fixture.

9. In a broaching machine having a pair of oppositely movable work fixtures, each fixture having a cutting position and a work loading position, the combination of a common motor for actuating said fixtures simultaneously whereby when one is moving to a cutting position the other is moving to a loading position, power reciprocable work loaders associated with each fixture, and interlocking means to prevent operation of said motor until both of the work loaders are in a return position.

10. In a broaching machine having a broaching tool and a work supporting fixture movable to and from a position with respect to said broaching tool, the combination of a fluid operable motor for moving said fixture to a cutting position, a channel for supplying fluid pressure to said motor, a stop valve in said channel, means to lock the fixture in its cutting position, and means operable by said locking means upon movement to a locking position to shift said stop valve to a stop position and thereby stop said motor.

11. In a broaching machine having a broaching tool and a work supporting fixture movable to and from a position with respect to said broaching tool, the combination of a fluid operable motor for moving said fixture to a cutting position, a channel for supplying fluid pressure to said motor, a stop valve in said channel, means to lock the fixture in its cutting position, means operable by said locking means upon movement to a locking position to shift said stop valve to a stop position and thereby stop said motor, and a relief valve connected in parallel with said stop valve to permit a small additional power movement of said fixture after tripping of said stop valve.

12. In a broaching machine having broaching tools and work fixtures alternately movable to a broaching position with respect to said fixtures, a fluid operable motor for simultaneously moving said fixtures, one to a broaching position and the other to a loading position, a reversing valve for said motor, said reversing valve having a first port connected to said motor to cause actuation thereof in one direction, a second port connected to said motor for actuation in an opposite direction, a stop valve and a relief valve connected in parallel between each of said ports and said motor, power operable means for locking said fixtures in a cutting position, means coupling the individual stop valves to the respective locking means whereby locking of a fixture will cause stopping of said motor by shutting off the return flow therefrom, and means operable by the locking means when the fixture is released to shift said stop valve and thereby connect pressure to the return channel for causing an opposite direction of actuation of said motor.

13. A broaching machine of the character described, including a broach ram, a first broaching means carried thereby for effecting a broaching operation during movement of the ram in one direction, a second broaching means carried by the ram for effecting a broaching operation upon opposite movement of the ram, spaced work receiving fixtures, each having an operative position adjacent one of the broaching means and an inoperative loading position, said loading positions being in staggered relation one to the other, a reversing transferring mechanism intermediate the loading stations of the respective fixtures in position to receive a work piece from one of the fixtures when at its loading station and operable to transfer the received work piece in juxtaposition to the second fixture at its loading station in a reversed position of the work, and a common drive mechanism for effecting inverse shiftings of the work receiving fixtures into and out of operative relation with the broach and a timed alignment of the work transfer mechanism with the fixture being actuated into loading position.

14. A broaching machine of the character described, including a broach ram, a first broaching means carried thereby for effecting a broaching operation during movement of the ram in one direction, a second broaching means carried by the ram for effecting a broaching operation upon opposite movement of the ram, spaced work receiving fixtures, each having an operative position adjacent one of the broaching means and an inoperative loading position, said loading positions being in staggered relation one to the other, a reversing transferring mechanism intermediate the loading stations of the respective fixtures in position to receive a work piece from one of the fixtures when at its loading station and operable to transfer the received work piece in juxta-position to the second fixture at its loading station in a reversed position of the work, a common drive mechanism for effecting inverse shiftings of the work receiving fixtures into and out of operative relation with the broach and a timed alignment of the work transfer mechanism with the fixture being actuated into loading position, means for effecting movement of a work piece from the first to the second-mentioned fixtures at their respective loading stations by way of the reversing transfer mechanism, and control mechanism for determining the cycle of shifting movements imparted to the work piece.

15. A broaching machine of the character described, including a broach ram, a first broaching means carried thereby for effecting a broaching operation during movement of the ram in one direction, a second broaching means carried by the ram for effecting a broaching operation upon opposite movement of the ram, spaced work receiving fixtures, each having an operative position adjacent one of the broaching means and an inoperative loading position, said loading positions being in staggered relation one to the other, a reversing transferring mechanism intermediate the loading stations of the respective fixtures in position to receive a work piece from one of the fixtures when at its loading station and operable to transfer the received work piece in juxta-position to the second fixture at its loading station in a reversed position of the work, a common drive mechanism for effecting inverse shiftings of the work receiving fixtures into and out of operative relation with the broach and a timed alignment of the work transfer mechanism with the fixture being actuated into loading position, means for effecting movement of a work piece from the first to the second-mentioned fixtures at their respective loading stations by way of the reversing transfer mechanism, control mechanism for determining the cycle of shifting movements imparted to the work piece, and means for effecting an initially accelerated and subsequently decelerated actuation of the work fixtures and reversing transfer mechanism.

16. A broaching machine of the character described, including a reciprocable broaching ram, a pair of spaced work receiving fixtures oscillatable about axes extending parallel with the plane of reciprocation of the broach ram to present work pieces into and out of operative relation with the ram, a work transfer mechanism intermediate said fixtures oscillatable about an axis at right angles to the plane of movement of the ram and alignable with the respective fixtures in their retracted position, an oscillatable hydraulic motor, a rock shaft operable thereby, reverse driving connections between the shaft and the work holding fixtures for corresponding reverse actuations of the fixtures, and an additional drive connection between the rock shaft and the work transfer device for effecting an end for end reversal of the transfer device on each oscillation of the shaft substantially as and for the purpose described.

17. The combination with a broaching machine including a bed and a broach carrying ram reciprocably mounted thereon and means for effecting reciprocation of the ram, of means for determining presentation of a work piece in operative relation to the ram, including a pair of spaced work engaging fixtures, means for effecting individual alternate movements of the fixtures toward and from the ram, and a reversible transfer device intermediate said fixtures having a first position aligned with one of said fixtures for receiving a work piece therefrom and a second position aligned with the other of said fixtures for transferring the work piece thereto.

18. The combination with a broaching machine including a bed and a broach carrying ram reciprocably mounted thereon and means for effecting reciprocation of the ram, of means for determining presentation of a work piece in operative relation to the ram, including a pair of spaced work engaging fixtures, means for effecting individual alternate movements of the fixtures toward and from the ram, a reversible transfer device intermediate said fixtures having a first position aligned with one of said fixtures for receiving a work piece therefrom and a second position aligned with the other of said fixtures for transferring the work piece thereto, and power means for effecting shifting of a work piece from the first to the second fixture by way of said transfer device.

19. The combination with a broaching machine including a bed and a broach carrying ram reciprocably mounted thereon and means for effecting reciprocation of the ram, of means for determining presentation of a work piece in operative relation to the ram, including a pair of spaced work engaging fixtures, means for effecting individual alternate movements of the fixtures toward and from the ram, a reversible transfer device intermediate said fixtures having a first position aligned with one of said fixtures for receiving a work piece therefrom and a second position aligned with the other of said fixtures for transferring the work piece thereto, and synchronizing means for alternately positioning the transfer mechanism in alignment with the respective fixtures when the same are in retracted position as respects the ram.

20. A machine for broaching cylinder blocks or the like including a bed, a ram horizontally reciprocable on said bed, spaced work supporting fixtures carried by the bed, means establishing individual horizontal loading stations and vertical ram opposing working stations for the respective fixtures, means for effecting alternate and opposite movement of the respective fixtures into loading and broach opposing positions, and a power operable reversing mechanism intermediate said fixtures whereby a semi-finished work piece may be transferred from one of said fixtures to the other for performance of a subsequent operation on the work piece.

21. A machine for broaching cylinder blocks or the like including a bed, a ram horizontally reciprocable on said bed, spaced work supporting fixtures carried by the bed, means establishing individual horizontal loading stations and vertical ram opposing working stations for the respective fixtures, means for effecting alternate and opposite movement of the respective fixtures into loading and broach opposing positions, a power operable reversing mechanism intermediate said fixtures whereby a semi-finished work piece may be transferred from one of said fixtures to the other for performance of a subsequent operation on the work piece, and means for synchronizing the movements of the fixtures and transfer mechanism whereby the reversing mechanism is successively aligned with the respective fixtures when in other loading positions.

MILLARD ROMAINE.
AMOS H. HAWLEY.
HERMAN HORLACHER.